Aug. 27, 1940. A. J. MARSHAUS Re. 21,545

TUBULAR LAMP BASE AND SOCKET

Original Filed March 25, 1938

Inventor:
Anthony J. Marshaus,
by Harry E. Dunham
His Attorney.

Reissued Aug. 27, 1940 Re. 21,545

UNITED STATES PATENT OFFICE 21,545

TUBULAR LAMP BASE AND SOCKET

Anthony J. Marshaus, East Cleveland, Ohio, assignor to General Electric Company, a corporation of New York Original No. 2,137,174, dated November 15, 1938, Serial No. 198,056, March 25, 1938. Application for reissue July 1, 1939, Serial No. 282,500

20 Claims. (Cl. 176—126)

My invention relates to electric lamps and similar devices, and more particularly to a base and socket construction for such devices. Still more particularly, my invention relates to a base and socket construction for electric lamps of the double-ended discharge type, in which a filamentary electrode is mounted at each end of the lamp.

One object of my invention is to provide a base and socket construction for electric lamps wherein the lamp may be readily inserted in its socket and positively locked therein so as to effectively prevent unwarranted or premature disengagement therebetween.

Another object of my invention is to provide an electric lamp socket in which the contact terminals are entirely concealed and unexposed so that the danger of shock or of short circuits is absent.

Still another object of my invention is to provide a base and socket construction for electric lamps wherein the lamp may be freely rotated in its socket, thereby eliminating the possibility of the base contact prongs being broken off the base, or the cement bond between the base and the glass envelope of the lamp being disrupted during insertion in or removal of the lamp from its socket.

A further object of my invention is to provide a lamp base construction which will insure the correct assembly of the lamp in its socket, thereby eliminating the possibility of any binding or jamming of the base in the socket during insertion of the lamp in such socket.

A still further object of my invention is to provide a socket and base construction for electric lamps in which the base is provided with a plurality of pins or prongs arranged in a common plane, and the socket is provided with a circular slot and a diametrical slot with leaf springs disposed in said circular slot on opposite sides of said diametrical slot, whereby the lamp base prongs may be inserted in said diametrical slot and the lamp then rotated to bring certain of said prongs into interlocking engagement with the leaf springs.

Further objects and advantages of my invention will appear from the following detailed description of a species thereof and from the accompanying drawing.

Figure 1:
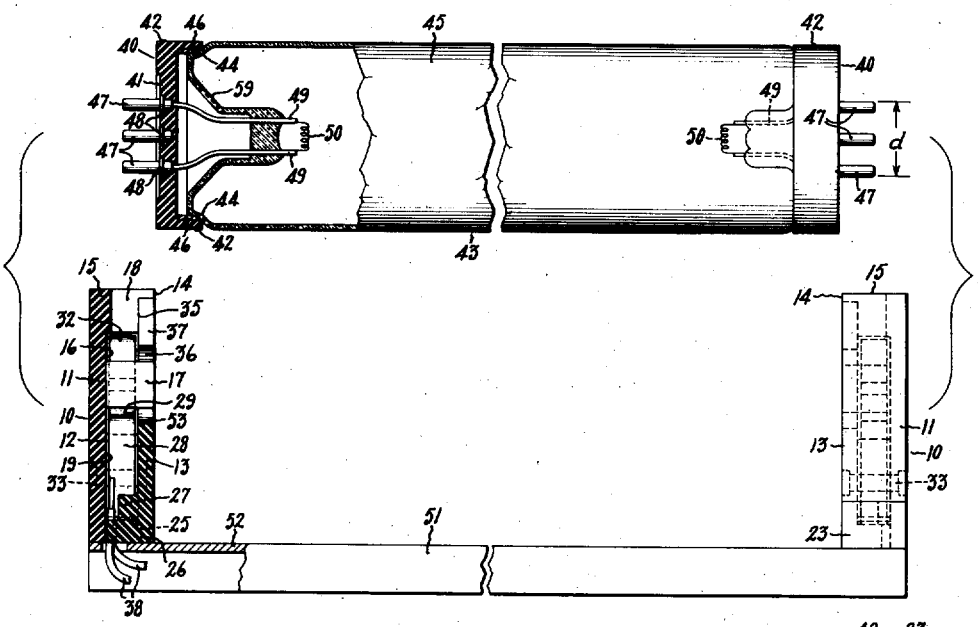
Figure 2:
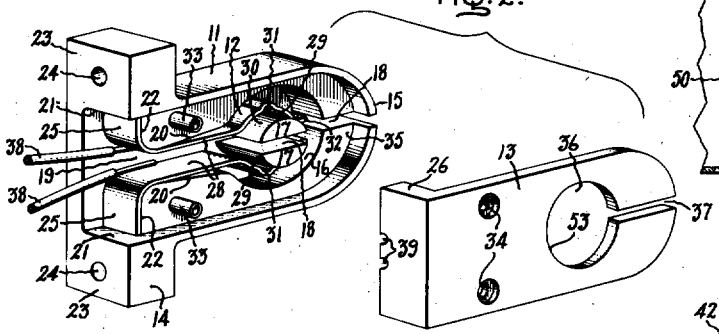
Figure 6:
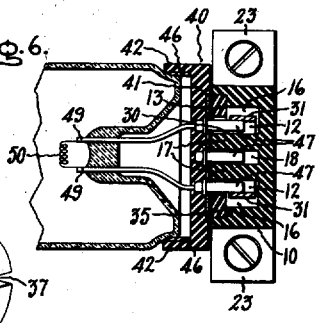
Figure 3:
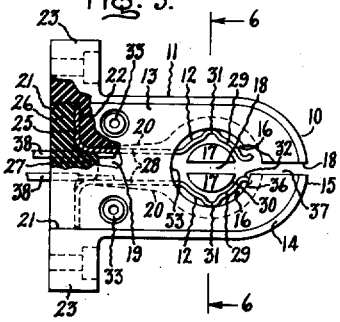
Figure 7:
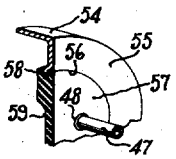
Figure 5:
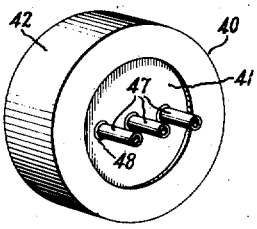
Figure 4:
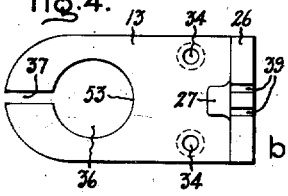

In the drawing, Fig. 1 is a side view, partly in section, of a base and socket construction comprising my invention, the base being mounted on a lamp disposed in correct position preparatory to its insertion in the socket; Fig. 2 is an isometric view of the socket shown in Fig. 1 with the cover plate removed and shown separate therefrom; Fig. 3 is an end view, partly in section, of the inner or lamp-engaging end of the socket shown in Fig. 1; Fig. 4 is a detailed view of the cover plate for the socket shown in Fig. 1; Fig. 5 is an isometric view of the lamp base shown in Fig. 1; Fig. 6 is a sectional view on the line 6—6 of Fig. 3 with the lamp shown in correct assembled position in the socket; and Fig. 7 is a fragmentary isometric view of a modified form of base comprising my invention.

Referring to the drawing, the socket 10 according to my invention comprises a base or body member 11, a pair of spring fingers or contact members 12, 12, and a cover plate 13. The base and cover plate members 11 and 13 respectively are made of suitable insulating material, preferably that commercially known as Bakelite. The inner or lamp-engaging side 14 of the base member is hollowed out adjacent its front wall 15 to provide a circular slot 16 forming a cylindrical stud 17, and a diametrical slot 18 extending rearwardly from the front wall 15 back through the cylindrical stud 17. The inner side 14 of the base member is further hollowed out rearwardly of the circular slot 16 to provide a channel 19 in substantial alignment with the said diametrical slot 18 and extending rearwardly from the circular slot 16 to the back of the base member. To provide clearance for flexing of the spring contact members 12, the walls 20 of the channel 19 diverge forwardly. At its rearmost extremity the channel 19 is widened or enlarged, as indicated at 21, to thereby provide suitable abutment shoulders 22, 22 for the spring contact members 12, 12. These abutment shoulders preferably extend at approximately right angles to the longitudinal axis of the channel 19. The base member is provided at its rear with a pair of oppositely extending projections 23, 23 having openings 24 through which socket mounting screws are adapted to extend.

Mounted within the hollowed-out portions 16 and 19 of the base members are the plate spring elements 12, 12 previously referred to, said spring elements constituting the terminal or contact members of the socket. These contact members are preferably made of full-spring phosphor-bronze, and are bent laterally at their rear extremities to provide mounting lugs 25 which are securely clamped against the abutment shoulders 22 by a clamping lug 26 extending from the rear of the cover plate 13. The two contact members are separated from each other by a spacing lug 27 provided for that purpose on the cover plate. As is evident from Fig. 3, this spacing lug 27 extends into the channel 19 in the base member between the finger portions 28 of the contact members lying in said channel. The width of the spacing lug 27 is preferably such as to clamp the finger portions 28 against the rear extremities of the forwardly diverging channel walls 20, 20.

The forward portions of the spring fingers 28 are curved away from each other to thereby provide arcuate portions 29 extending into the circular slot 16 on opposite sides of the diametrical slot 18. The arcuate portions 29 are so formed as to be substantially concentric with the circular slot 16, and are preferably curved on a radius equal to or slightly larger than that of the inner wall 30 of the said circular slot. To provide a definite rotative locked position for the lamp, the arcuate portions 29 of the spring fingers 28 are provided with outwardly extending diametrically opposite notches 31, 31 preferably located in a plane extending substantially at right angles to the diametrical slot 18. The forward extremities of the arcuate portions 29 are curled outwardly, as indicated at 32, and preferably terminate adjacent the plane of the walls of the diametrical slot 18 so as not to obstruct the same.

The hollowed-out side of the base member 11 is covered by the previously mentioned cover plate 13 which is secured to the base member by means of rivets 33, preferably of soft brass, embedded in the molded material of the base member and extending through properly located openings 34 in the cover plate. The side wall 14 of the base member is preferably recessed an amount equal to the thickness of the cover plate to form a recessed mounting seat 35 therefor, thus providing a flush mounting for the cover plate. A circular opening 36, concentric with the circular slot 16 in the base member, is provided in the cover plate 13, as well as a slot 37 in alignment with and of the same width as the diametrical slot 18 in the base member. The slot 37 extends from the front of the cover plate back to the circular opening 36, thus providing a passageway thereinto.

As before described, the cover plate 13 is formed at its rear extremity with a clamping lug 26 which extends into the widened recess 21 at the rear of the base member and clamps the mounting lug 25 on each spring contact member 12 against its co-operating abutment shoulder 22 on the base member. In addition, the cover plate is further provided with the previously referred to spacing lug 27 which extends into the channel 19 in the base member and maintains the spring contact members 12, 12 in spaced relation. Circuit connections to the contact members of the socket are made by means of wire leads 38, 38 soldered to the finger portions 28 of the contact members closely adjacent the bottom wall of the channel 19, and extending out through channels or grooves 39, 39 provided for that purpose in the clamping lug 26 on the cover plate.

The lamp base 40 for co-operation with the above-described socket 10 comprises a cup-shaped body of suitable insulating material preferably of Bakelite and consisting of a bottom or end wall 41 and a cylindrical wall 42. The cylindrical wall is of the proper internal diameter to fit loosely over the end or neck portion 44 of the glass envelope 45 of the lamp 43, to which neck portion the base is united by suitable cement 46. The base 40 is provided with three outwardly extending equally spaced, and aligned prongs or pins 47 mounted in the end wall 41 of the base and extending therethrough. However, if desired, the center pin may be omitted and only the two outer pins employed. While not necessary, the pins 47 are preferably mounted in a common plane extending radially through the axis of the cylindrical base. The said pins 47 are hollow and are preferably made of brass and nickel plated. To control the extent to their outward projection, which should be slightly less than the total depth of the pin slots in the socket 10, the pins are provided with an annular locating shoulder 48 intermediate their ends. The pins may be secured to the end wall 41 of the base either by being molded therein, or by staking, in which the inner edges of the pins are rolled or peaned over onto the inner or rear surface of the end wall 41. The lamp lead wires 49, 49 extend into the hollow outer pins or prongs 47 and are soldered therein, preferably by dipping the hollow open-ended pins in a bath of molten solder.

Where the base and socket construction comprising my invention is to be used for mounting a double-ended lamp such as a fluorescent discharge tube, as shown at 43 in Fig. 1, a base 40 is mounted on each end of the lamp in such a way that all of the pins or prongs 47 lie in a common plane. The filamentary electrode 50 at each end of the lamp is connected by the lead wires 49 to the two outer pins 47 of the adjacent base 40, leaving the center pin in each base as a dummy pin. A pair of sockets 10, 10 constructed in accordance with my invention are mounted on a suitable fixture 51 so as to be in alignment with each other. The sockets should be spaced the proper amount from each other to thereby freely receive the lamp 43 therebetween. The sockets are accordingly spaced so that the distance between the opposing or facing surfaces 14, 14 is slightly greater than the length of the lamp 43 exclusive of the projecting pins or prongs 47. The socket lead wires 38, 38 extend through openings in the mounting wall 52 of the fixture 51 and are connected to suitable starting and operating apparatus which may be mounted, if desired, in the fixture.

To insert the lamp 43 in the sockets 10, 10, the lamp is first placed in the position shown in Fig. 1 with the pins 47 in alignment with the diametrical pin slots 18 and 37 in the sockets. The lamp is then inserted between the sockets by a straight inward movement, the pins 47 at each end of the lamp being guided at the same time into the co-operating diametrical pin slots in the sockets. The inward movement of the lamp is continued until the two outer pins at each end of the lamp are brought into alignment with, and the center or dummy pin coincides with the center of the circular slot 16 in the socket base member 11. To so align the outer base pins 47 with the said circular slot, the circular opening 36 in the socket cover plate 13 is made of the same diameter as, or slightly greater than the distance $d$ (Fig. 1) between the outer sides of the two outer base pins 47. Thus, that portion 53 of the wall of the circular opening 36 opposite or in line with the diametrical pin slot 37 constitutes a stop for limiting the inward movement of the lamp and simultaneously aligning the outer base pins with the circular pin slots 16 in each socket. The center or dummy pin at each end of the lamp insures the correct insertion of all the base pins into the diametrical pin slots in the sockets so that the first pin inserted cannot be jammed into the front portion of the circular pin slot 16 when moved into alignment therewith.

When the outer base pins at each end of the lamp have been moved into alignment with the circular pin slot 16 in each socket, as described above, the lamp may then be readily rotated in either direction against the spring resistance of the contact members 12 in each socket. By rotating the lamp in either direction, the two outer pins or prongs 47 in each base will engage the arcuate portions 29 of the spring contact members 12 and so flex the said members. When the lamp has been rotated approximately ninety degrees, the two outer base pins at each end of the lamp will be brought into alignment with, and will become locked in the notches 31 in the spring contact members 12, thereby providing a positive lock against unwarranted or premature disengagement of the lamp from the sockets. Thus where the lamp is to be mounted on a ceiling, so as to occupy an inverted position, there is no danger whatever of the lamp accidentally falling out of the sockets. During the above described rotation of the lamp in the sockets 10, 10, the center or dummy pins at each end of the lamp cooperate with the diametrical pin slot walls to thereby fix the axis of lamp rotation in a direction transversely of said diametrical slots.

In the modified form of lamp base shown in Fig. 7, the body portion thereof comprises a cylindrical metallic collar 54 provided with an inwardly extending end flange 55 forming a part of the base end wall. The collar 54 with its flange 55 is preferably punched as a unit from sheet brass, and is preferably nickel plated. The flange 55 is of uniform inward extent so as to thereby provide a centrally located circular opening 56 in the base end wall. This opening 56 is closed by a disc 57 of insulating material, preferably Bakelite, which is molded to the offset edge 58 of the flange 55 so as to lie flush with the outer surface of said flange. The desired number of base pins 47 (i. e., either two or three) are mounted in the Bakelite disc 57 in the same manner as in the previous form of base. The inner surface of the Bakelite disc 57 is formed with a centrally located circular recess 59 for the purpose of accommodating therein the exhaust tip of the lamp bulb. The brass cylindrical collar 54 is of the proper internal diameter to fit loosely over the neck portion 44 of the glass lamp envelope 45, and it is secured thereto in the same manner as before, i. e., by suitable cement 46.

The use of a brass collar 54 to encircle the neck portion 44 of the glass lamp envelope 45 obviates any danger of breakage of said neck portion by the contraction of shrinkage of the encircling collar or band of the base upon cooling, following the base cementing operation. In addition, the use of the relatively thin brass collar 54 together with the centrally located Bakelite disc 57 permits closer mounting of the base to the end of the lamp envelope 45 since the said disc 57 can extend into the recess in the end of the envelope provided by the stem tube flare 59. The result of such a closer mounting is to reduce the longitudinal extent of the darkened or unilluminated portions at each end of the lamp during operation, occasioned by the presence of a base thereat. This is particularly advantageous in cases where a series of lamps 43 are to be mounted in alignment with one another so as to approximate a continuous line of light. In this connection, the socket 10 may be somewhat widened and the opposite faces each provided with a pair of contact members 12, 12 thus forming, in effect, a double socket for mounting two lamps 43 end to end and in axial alignment to thereby approximate a continuous line of light.

From the above description, it is evident that I have provided an improved base and socket construction for the mounting of electric lamps and similar devices, particularly of the double-ended type, whereby the same may be positively locked in said sockets to guard against unwarranted disengagement therefrom. Furthermore, the contact members of my improved socket are well concealed by the cover plate thereof so as to prevent short circuits therebetween as well as injurious shocks therefrom.

What I claim as new and desire to secure by Letters Patent of the United States is:

1. A socket for electric lamps and similar devices comprising a member of insulating material, said member being provided in a face thereof with diametrically opposite arcuate slots and also with a slot extending diametrically of and intersecting both of said arcuate slots, said diametrical slot extending to an edge of said face, and spring contact members mounted in said member adjacent said arcuate slots and on opposite sides of said diametrical slot.

2. A socket for electric lamps and similar devices comprising a member of insulating material, said member being provided in a face thereof with diametrically opposite arcuate slots and also with a slot extending diametrically of and intersecting both of said arcuate slots, said diametrical slot extending to an edge of said face, and spring contact members mounted in said member adjacent said arcuate slots and on opposite sides of said diametrical slot, said contact members being provided with diametrically opposite notches.

3. A socket for electric lamps and similar devices comprising a member of insulating material, said member being provided in a face thereof with a circular slot and also with a slot extending diametrically of said circular slot and continuing to an edge of said face, and spring contact members mounted within said circular slot on opposite sides of said diametrical slot, said contact members having diametrically opposite notches disposed in a plane extending substantially transversely of said diametrical slot.

4. A socket for electric lamps and similar devices comprising a member of insulating material, said member being provided in a face thereof with a circular slot and also with a slot extending diametrically of said circular slot and continuing to an edge of said face, and spring contact members mounted within said member and having arcuate portions disposed in said circular slot on opposite sides of said diametrical slot, said arcuate portions being substantially concentric with the inner wall of said circular slot.

5. A socket for electric lamps and similar devices comprising a member of insulating material, said member being provided in a face thereof with a circular slot and also with a slot extending diametrically of said circular slot and continuing to an edge of said face, and spring contact members mounted within said member and having arcuate portions disposed in said circular slot on opposite sides of said diametrical slot, said arcuate portions being substantially concentric with the inner wall of said circular slot and having diametrically opposite notches disposed in a plane extending substantially transversely of said diametrical slot.

6. A socket for electric lamps and similar devices comprising a base member of insulating material, said base member being provided in a face thereof with a circular slot and also with a slot extending diametrically of said circular slot and continuing to an edge of said face, spring contact members mounted within said base member and having arcuate portions disposed in said circular slot on opposite sides of said diametrical slot, said arcuate portions being substantially concentric with the inner wall of said circular slot, and a cover plate of insulating material secured to said base member, said cover plate being provided with a circular opening concentric with said circular slot and of a diameter slightly larger than that of said arcuate portions and also being provided with a slot in alignment with said diametrical slot and extending to the edge of said cover plate.

7. In combination, an electric device provided with a base having a plurality of aligned pins extending outwardly therefrom, and a socket for co-operation therewith, said socket comprising a member of insulating material having diametrically opposite arcuate slots and a slot extending diametrically of and intersecting both of said arcuate slots, said diametrical slot extending to an edge of said member, and spring contact members mounted within said arcuate slots on opposite sides of said diametrical slot and constructed and arranged to engage certain of said pins upon their rotation in said arcuate slots.

8. In combination, a double-ended electric device having a base at each end, each of said bases having a plurality of aligned pins extending outwardly therefrom, all of said pins lying in a common plane, and a pair of spaced opposed sockets constructed and arranged to receive and mount the said electric device therebetween, the opposing faces of said sockets being provided with circular pin slots and aligned straight pin slots extending diametrically of said circular slots and continuing to the front edge of said faces, said sockets also having spring contact members mounted in said circular slots on opposite sides of said diametrical slots and constructed and arranged to engage certain of said pins upon their rotation in said arcuate slots.

9. In combination, a double-ended electric device having a base at each end, each of said bases having a plurality of aligned pins extending outwardly therefrom, all of said pins lying in a common plane, and a pair of spaced opposed sockets constructed and arranged to receive and mount the said electric device therebetween, said sockets being provided with opposing circular pin slots having diametrically opposite spring contact members therein, said sockets also having aligned straight pin slots extending rearwardly from the front edge thereof and diametrically intersecting said circular slots whereby the said electric device may be mounted in said sockets by insertion of the pins at each end of the device in the said straight pin slots in the adjacent socket followed by straight rearward movement of said device until the outer pins of each base are brought into alignment with the said circular slots whence the device may then be rotated in either direction to thereby bring the said outer pins into engagement with said contact members.

10. In combination, a double-ended electric device having a base at each end, each of said bases having a plurality of aligned pins extending outwardly therefrom, all of said pins lying in a common plane, and a pair of spaced opposed sockets constructed and arranged to receive and mount the said electric device therebetween, said sockets being provided with opposing circular pin slots having diametrically opposite spring contact members therein, the spring contact members in each socket being provided with diametrically opposite notches, said sockets also having aligned straight pin slots extending rearwardly from the front edge thereof and diametrically intersecting said circular slots whereby the said electric device may be mounted in said sockets by insertion of the pins at each end of the device in the said straight pin slots in the adjacent socket followed by straight rearward movement of said device until the outer pins of each base are brought into alignment with the said circular slots whence the device may then be rotated in either direction to thereby bring the said outer pins into interlocking engagement with the said notches in said contact members.

11. A socket for electric lamps and similar devices comprising a housing of insulating material, said housing being provided with diametrically opposite arcuate slots and also with a slot extending diametrically of and intersecting both of said arcuate slots, said diametrical slot extending to an edge of said housing, and spring contact members mounted in said housing adjacent said arcuate slots and on opposite sides of said diametrical slot.

12. A socket for electric lamps and similar devices comprising a housing of insulating material, said housing being provided with a circular slot and also with a slot extending diametrically of said circular slot and continuing to an edge of said housing and spring contact members mounted within said housing and having arcuate portions disposed in said circular slot on opposite sides of said diametrical slot, said arcuate portions being substantially concentric with the inner wall of said circular slot.

13. In a socket for electric lamps or the like, a housing of insulating material having a recess therein, a cylindrical stud upstanding from the bottom of said recess, said stud being provided with a diametrical slot, said housing being provided with a slot extending from said recess to an outer edge thereof in alignment with the slot in said stud and spring contact members having portions in said recess cooperating with said stud on opposite sides of said diametrical slot for engaging the prongs of a lamp or the like.

14. In a socket for electric lamps or the like, a housing of insulating material having a recess therein, a stud located in said recess and being provided with an intermediate slot, said housing being provided with a slot extending from said recess to an outer edge thereof in alignment with the slot in said stud, and spring contact members having portions in said recess cooperating with said stud on opposite sides of said intermediate slot for engaging the prongs of a lamp or the like.

15. In a socket for electric lamps or the like, a housing of insulating material having a recess therein, a stud upstanding from the bottom of said recess, said stud being provided with an intermediate slot, said housing being provided with a slot extending from said recess to an outer edge thereof in alignment with the slot in said stud, and spring contact members having portions in said recess cooperating with said stud on opposite sides of said intermediate slot, said housing having a stop portion in alignment with said slots for engaging one of the spaced prongs of a lamp or the like to locate the prongs in relation to said stud and contact members whereby said prongs may be rotated about said stud into engagement with said contact members.

16. In a socket for use with electric lamps having spaced contact pins, a support of insulating material having at least one face with an opening therein and a slot extending from said opening to an edge thereof, spaced flexible contact members mounted in said support within said opening, a slotted member of insulating material between said contacts, said slot and said member constituting means for guiding said contact pins into said opening through said slot by straight line motion and for allowing rotation thereof into engagement with said contact members.

17. In a socket for use with electric lamps having spaced contact pins, a housing of insulating material having a recess therein and a slot merging with said recess and extending to an edge of said housing, spaced contact members in said recess, a member in said recess having a groove in alignment with said slot, said slot and said grooved member constituting means for guiding said contact pins into said recess by straight line movement along said slot and said groove and for allowing rotation thereof into engagement with said contact members.

18. In a socket for use with a lamp having spaced contact pins, contact members comprising spaced parallel blades movable relatively to each other, walls forming a slot located between said contact blades, and means for guiding straight line motion of said lamp pins into said slot and rotary motion of said lamp pins into engagement with said movable contact blades.

19. In a lamp socket for use with lamps having aligned contact pins to be inserted by lateral movement and brought into contacting relation by rotation, a support of insulating material having walls defining an opening in at least one face and a slot extending from said opening to the edge of said face, spaced flexible contact members mounted in said support within said opening and a guide member of insulating material between said contacts, and spaced throughout its perimeter from the peripheral wall of said opening.

20. In a lamp socket for use with lamps having spaced aligned contact pins to be inserted by movement transverse to the axis of the lamp and brought into a releasable locked contacting relation by rotation, a support of insulating material having walls defining an opening in one face and a slot extending from said opening to an edge of said face to provide for transverse movement of the contact pins therethrough to a position within said opening and flexible contact members mounted on said support within said opening in diametrically opposed spaced relationship and adapted to hold said contact pins in a releasable locked rotative position while permitting rotation of said lamp in either direction whereby the lamp contact pins may be passed through said slot and freely rotated within said opening for engagement with said contact members.

ANTHONY J. MARSHAUS.